United States Patent
Tazartes et al.

(10) Patent No.: US 8,224,574 B2
(45) Date of Patent: *Jul. 17, 2012

(54) SYSTEM FOR MULTIPLE NAVIGATION COMPONENTS

(75) Inventors: Daniel A. Tazartes, West Hills, CA (US); Charles H. Volk, Newbury Park, CA (US); James R. Huddle, Chatsworth, CA (US); Jerome S. Lipman, Sherman Oaks, CA (US); Maureen Lipman, legal representative, Sherman Oaks, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 1325 days.

This patent is subject to a terminal disclaimer.

(21) Appl. No.: 11/124,724

(22) Filed: May 9, 2005

(65) Prior Publication Data

US 2005/0256637 A1 Nov. 17, 2005

(51) Int. Cl.
*G01C 21/00* (2006.01)

(52) U.S. Cl. ........ 701/500; 701/469; 701/466; 701/468; 701/472; 701/473; 342/357.2; 342/357.59; 244/3.1; 244/3.2

(58) Field of Classification Search .................. 701/214, 701/220, 3, 469, 466, 472, 500, 473, 480, 701/479; 709/208; 700/3; 342/357.2, 357.59; 244/3.1, 3.2

See application file for complete search history.

(56) References Cited

U.S. PATENT DOCUMENTS

| | | | | |
|---|---|---|---|---|
| 5,150,856 A * | 9/1992 | Gaide | ............................ | 244/3.2 |
| 5,640,325 A * | 6/1997 | Banbrook et al. | ............ | 364/453 |
| 5,929,805 A * | 7/1999 | Tadros et al. | ............ | 342/357.07 |
| 6,094,163 A * | 7/2000 | Chang | ...................... | 342/357.59 |
| 6,424,914 B1 * | 7/2002 | Lin | ................ | 701/214 |
| 6,850,826 B1 * | 2/2005 | Nishiyama et al. | ............. | 701/48 |
| 7,133,776 B2 * | 11/2006 | Buchler et al. | ................ | 701/220 |
| 7,236,878 B2 * | 6/2007 | Watanabe | ..................... | 701/200 |
| 2002/0120400 A1 * | 8/2002 | Lin | ................ | 701/214 |
| 2004/0030464 A1 | 2/2004 | Buchler et al. | | |
| 2004/0193372 A1 * | 9/2004 | MacNeille et al. | ........... | 701/213 |
| 2004/0204852 A1 * | 10/2004 | Robbins | ....................... | 701/214 |

FOREIGN PATENT DOCUMENTS

| | | | |
|---|---|---|---|
| EP | 0 179 197 | | 4/1986 |
| WO | WO 02/35183 | * | 5/2002 |
| WO | WO/0235183 | * | 5/2002 |

* cited by examiner

*Primary Examiner* — Redhwan K Mawari
(74) *Attorney, Agent, or Firm* — Carmen Patti Law Group, LLC (57) ABSTRACT

An exemplary navigation system uses a master navigation component at a first location in a vehicle and a slave navigation component at a second location that is a variable displacement to the first location due to physical deformation of the vehicle. Static and dynamic location components provide static and dynamic information of the displacement between the first and second locations. An error estimator estimates errors in the navigational measurement data generated by the slave navigation component based on the navigational measurement data generated by the master navigation component and the displacement information provided by the static and dynamic location components. The master navigation component corrects the navigation measurement data of the slave navigation component based on the determined error and translates the corrected navigation measurement data of the slave navigation component into navigational measurement data in its coordinate system.

10 Claims, 4 Drawing Sheets

SYSTEM FOR MULTIPLE NAVIGATION COMPONENTS

BACKGROUND

Sensing systems on a vehicle require knowledge of navigation parameters, for example, velocity, position, and orientation, of the sensors to provide accurate measurements from the sensors while the vehicle is in motion. The vehicle comprises a high performance reference navigation system, for example, a master navigation system, to provide velocity, position, and orientation of the vehicle relative to a reference navigation coordinate system. The master navigation system is mounted in the vehicle but is usually physically separated from the sensing systems. As the vehicle is in motion, the vehicle bends. The bending of the vehicle causes instantaneous discrepancies between the position expressed by the master navigation system and the position experienced by the sensor. The difference between the position expressed by the master navigation system and the position experienced by the sensor is the "lever arm error." The lever arms between the master navigation system and the sensing systems are nominally known. As one shortcoming, due to bending of the vehicle, errors are induced into the velocity, position, and orientation of the sensing system where outputs of the master navigation system are corrected based on the nominal lever arms.

For example, in a synthetic aperture radar, an image is formed by combining signals from multiple sensors over a period of time while the radar is in motion. The lever arms between the master navigation system and the multiple sensors are nominally known. Where the vehicle bends, variations in the motion of the vehicle degrade the image. Data from the master navigation system is utilized to compensate the signals from the multiple sensors to form the image. The master navigation system employs the nominal lever arms to compensate the signals from the multiple sensors. While the vehicle is in motion, the position expressed by the master navigation system is different from the position experienced by the sensor as the master navigation system is separated from the sensing system. The difference is the lever arm error.

One prior art solution to reduce the level arm error is to employ a high performance navigation system, for example, a slave navigation system, at a location of the sensing system to provide velocity, position, and orientation of the sensing system. As another shortcoming, it is costly to add additional high performance navigation systems into the vehicle. Another prior art solution to reduce the level arm error is to employ a smaller, lightweight, lower performance navigation system, for example, a slave navigation system, at a location of the sensing system. The slave navigation system at the location of the sensing system determines the velocity, position, and orientation of the sensing system relative to a coordinate system defined by the slave navigation system at the location of the sensing system. As yet another shortcoming, the coordinate system defined by the slave navigation system at the location of the sensing system differs from the reference coordinate system defined by the master navigation system of the vehicle. Where multiple sensing systems and multiple navigation systems are employed on the vehicle, the navigation systems employ multiple reference coordinate systems. It is desirable to obtain data from the sensing systems in the same coordinate system.

Thus, a need exists for determining navigation parameters of a plurality of sensors on a vehicle relative to one coordinate system.

DESCRIPTION OF THE DRAWINGS

Features of exemplary implementations of the invention will become apparent from the description, the claims, and the accompanying drawings in which:

DETAILED DESCRIPTION

Figure 1:
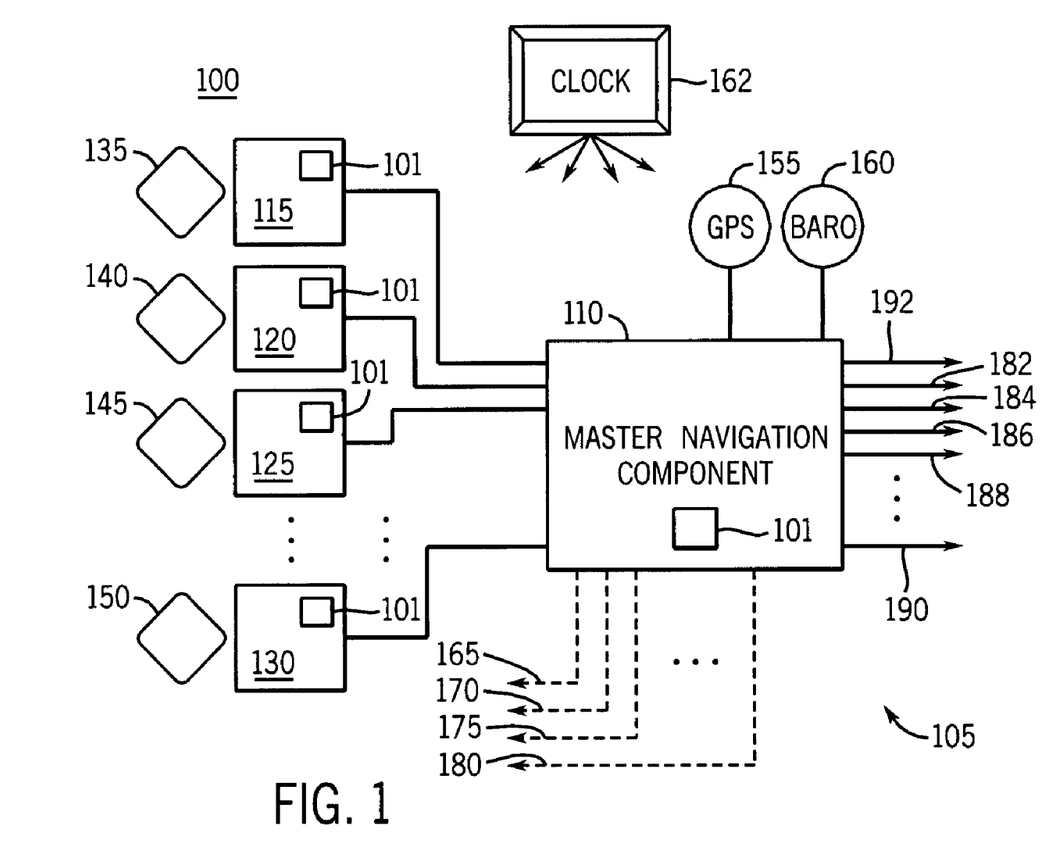
FIG. 1 is a representation of one implementation of an apparatus that comprises one or more vehicles, one or more master navigation components, one or more slave navigation components, one or more sensors, and one or more external positioning components.

Turning to FIG. 1, an apparatus 100 in one example comprises one or more vehicles 105, one or more master navigation components 110, one or more slave navigation components 115, 120, 125, and 130, one or more sensors 135, 140, 145, and 150, and one or more external positioning components 155 and 160. The vehicle 105 in one example comprises a car, a tank, an airplane, an airship, or a space vehicle. The master navigation component 110 comprises a high performance navigation system to provide velocity, position, and attitude of the vehicle 105. The master navigation component 110 employs accelerometers and gyroscopes to determine the velocity, position, and attitude of the vehicle 105. For example, the master navigation component 110 comprises an Inertial Navigation System ("INS").

The slave navigation components 115, 120, 125, and 130 in one example comprise one or more inertial sensors, for example, three linear accelerometers and three gyros, to determine position and attitude of the sensors 135, 140, 145 and 150. For example, the slave navigation components 115, 120, 125, and 130 comprise one or more Inertial Measurement Units ("IMUs"), as will be understood by those skilled in the art. The one or more sensors 135, 140, 145, and 150 in one example comprise one or more synthetic aperture radars, one or more optical sensors, or one or more acoustic sensors. The external positioning components 155 and 160 comprise a Global Positioning System ("GPS") receiver and a baro-altimeter. The master navigation component 110 and the slave navigation components 115, 120, 125, and 130 comprise an instance of a recordable data storage medium 101, as described herein.

The master navigation component 110 employs one or more sensors to determine navigation measurement data for the vehicle 105. The navigation measurement data for the vehicle 105 in one example comprises: inertial measurement data, positioning measurement data, air speed measurement data, and/or pressure altitude measurement data. In one example, the master navigation component 110 employs one or more inertial sensors to determine inertial measurement data for the vehicle 105. In another example, the master navigation component 110 employs one or more pressure altitude sensors to determine pressure altitude measurement data for the vehicle 105. In yet another example, the master navigation component 110 employs one or more GPS units to determine GPS measurements for the vehicle 105. In yet another example, the master navigation component 110 employs one or more air speed sensors to determine air speed measurements for the vehicle 105. The master navigation component 110 employs the navigation measurement data to determine a navigation and orientation solution for the vehicle 105 that describes the location/position of the vehicle 105 with respect to a reference coordinate system, for example, the Earth.

The master navigation component 110 establishes a coordinate system, for example, a first coordinate system, with respect to the reference coordinate system based on the navigation measurement data for the vehicle 105, as will be understood by those skilled in the art. In one example, the master navigation component 110 employs data from the external position component 155, for example, GPS data, pressure altitude, or air data, to establish the coordinate system, as will be appreciated by those skilled in the art. In another example, the master navigation component 110 employs navigation measurement data from the slave navigation components 115, 120, 125, and 130, and positioning information from the external positioning components 155 and 160 to establish the coordinate system for the vehicle 105. In yet another example, the master navigation component 110 employs the navigation measurement data from the slave navigation components 115, 120, 125, and 130 to further refine the coordinate system established by the master navigation component 110 for the vehicle 105. The master navigation component 110 employs the coordinate system and the navigation measurement data for the vehicle 105 to describe the orientation of the vehicle 105 as a function of time.

The master navigation component 110 communicates with the slave navigation components 115, 120, 125, and 130 to describe the position of the sensors 135, 140, 145, and 150 relative to the coordinate system established by the master navigation component 110, for example, the first coordinate system. The master navigation component 110 obtains navigation measurement data, for example, inertial measurement data, for the slave navigation components 115, 120, 125, and 130 as a function of time. The master navigation component 110 comprises one or more error estimation components, for example, one or more Kalman filters, to estimate one or more errors in the navigation measurement data of the slave navigation components 115, 120, 125, and 130. The master navigation component 110 corrects the navigation measurement data of the slave navigation components 115, 120, 125, and 130 based on the errors. The master navigation component 110 provides the corrected navigation measurement data to the slave navigation components 115, 120, 125, and 130, as illustrated by outputs 165, 170, 175, and 180. The slave navigation components 115, 120, 125, and 130 employ the corrected navigation measurement data to improve estimations of navigation parameters (e.g., orientation, position, and velocity) of the sensors 135, 140, 145, and 150.

The master navigation component 110 translates the navigation measurement data of the slave navigation components 115, 120, 125, and 130 from coordinate systems established by the slave navigation components 115, 120, 125, and 130, for example, one or more second coordinate systems, to the coordinate system established by the master navigation component 110, for example, the first coordinate system, as will be appreciated by those skilled in the art. The master navigation component 110 provides as output 182, navigation parameters for the master navigation component 110 in the coordinate system established by the master navigation component 110, for example, the first coordinate system. The master navigation component 110 provides navigation parameters (e.g., orientations, velocities, and positions) of the sensors 135, 140, 145, and 150 in the coordinate system established by the master navigation component 110, as illustrated by the outputs 184, 186, 188, and 190. The master navigation component 110 provides the orientation of the coordinate reference system as output 192.

The master navigation component 110 estimates one or more lever arms (i.e. parameters used to model three dimensional distance vectors) between the master navigation component 110 and the slave navigation component 115, the master navigation component 110 and the slave navigation component 120, the master navigation component 110 and the slave navigation component 125, and the master navigation component 110 and the slave navigation component 130. The slave navigation components 115, 120, 125, and 130 employ the estimation of the lever arms to determine dynamic motion of the sensors 135, 140, 145, and 150 relative to the coordinate system established by the master navigation component 110.

The master navigation component 110 synchronizes the navigation measurement data of the slave navigation components 115, 120, 125, and 130 as a function of time provided by the slave navigation components 115, 120, 125, and 130 with the navigation measurement data of the master navigation component 110. In one example, the slave navigation component 115 provides a timestamp along with navigation measurement data for the slave navigation component 115. The master navigation component 110 compares the navigation measurement data for the slave navigation component 115 with the navigation measurement data of the master navigation component 110 at a time described by the timestamp. In another example, the master navigation component 110 and the slave navigation components 115, 120, 125, and 130 operate on a synchronized clock, for example, a clock 162. In yet another example, the master navigation component 110 and the slave navigation components 115, 120, 125, and 130 employ timing pulses to synchronize the navigation measurement data of the master navigation component 110 with the navigation measurement data of the slave navigation components 115, 120, 125, and 130.

The slave navigation components 115, 120, 125, and 130 determine navigation parameters (e.g., orientation, position, and velocity) of the sensors 135, 140, 145, and 150. The slave navigation components 115, 120, 125, and 130 compensate the output of the sensors 135, 140, 145, and 150 based on the orientation, position, and/or velocity of the sensors 135, 140, 145, and 150. The slave navigation components 115, 120, 125, and 130 communicate with the master navigation component 110 to provide the navigation measurement data of the slave navigation components 115, 120, 125, and 130 to the master navigation component 110. The slave navigation components 115, 120, 125, and 130 receive corrected navigation measurement data of the slave navigation components 115, 120, 125, and 130 from the master navigation component 110. The slave navigation components 115, 120, 125, and 130 employ the corrected navigation measurement data of the slave navigation components 115, 120, 125, and 130 to describe the position of the sensors 135, 140, 145, and 150 with respect to the coordinate system established by the master navigation component 110. For example, the slave navigation component 115 employs the corrected navigation measurement data of the slave navigation component 115 to determine motion of the sensor 135 relative to the coordinate system established by the master navigation component 110.

An illustrative description of exemplary operation of the apparatus 100 is presented, for explanatory purposes.

Figure 2:
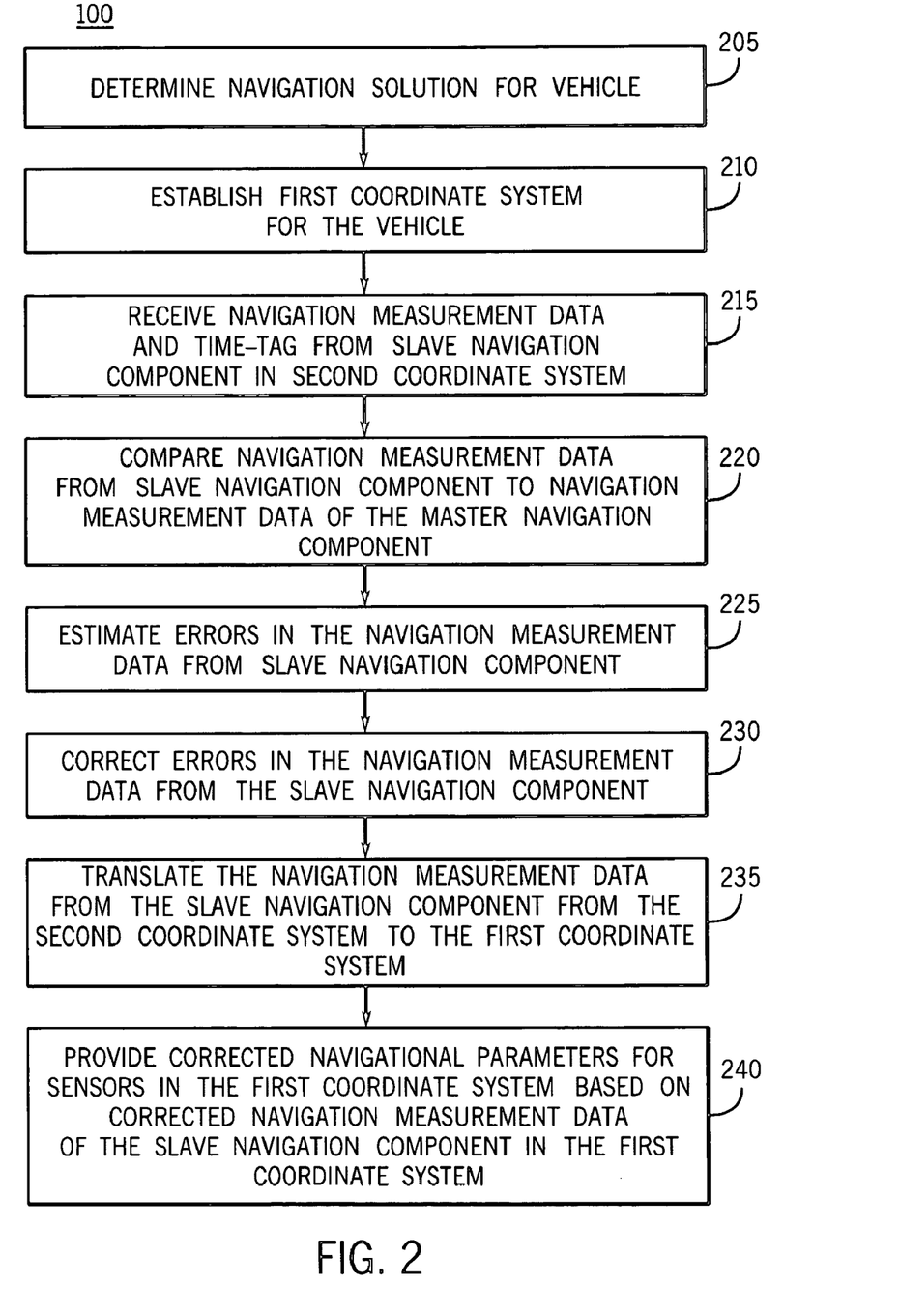
FIG. 2 is a representation of an exemplary process flow for providing corrected navigational parameters for the sensors from the master navigation component to the slave navigation components of the apparatus of FIG. 1.

Turning to FIG. 2, in STEP 205, the master navigation component 110 determines a navigation solution as a function of time for the vehicle 105. In STEP 210, the master navigation component 110 employs navigation measurement data and optional data from the external positioning component 155 to establish a coordinate system for the vehicle 105, for example, a first coordinate system, in relation to the Earth. In STEP 215, the master navigation component 110 receives navigation measurement data with respect to a coordinate system established by the slave navigation component 115, for example, a second coordinate system, and time-tag from the slave navigation component 115 for the sensor 135. The master navigation component 110 employs the time-tag to determine the navigation measurement data of the master navigation component 110 at a time described by the time-tag. In STEP 220, the master navigation component 110 compares the navigation measurement data of the slave navigation component 115 at the time described by the time-tag to the navigation measurement data of the master navigation component 110 at the time described by the time-tag. The navigation measurement data of the master navigation component 110 at the time described by the time-tag in one example comprises navigation measurement data of the master navigation component 110 adjusted by one or more lever arms between the master navigation component 110 and the slave navigation components 115, 120, 125, and 130, as described herein.

In STEP 225, the master navigation component employs a Kalman filter to estimate errors in the navigation measurement data from the slave navigation component 115. In STEP 230, the master navigation component 110 corrects the errors in the navigation measurement data from the slave navigation component 115. In STEP 235, the master navigation component 110 translates the corrected navigation measurement data for the slave navigation component 115 from the coordinate system established by the slave navigation component 115, (e.g., the second coordinate system) to the coordinate system established by the master navigation component 110 (e.g., the first coordinate system). In STEP 240, the master navigation component 110 employs the corrected and translated navigation measurement data for the slave navigation component 115 in the first coordinate system to provide navigation parameters for the sensor 135, for example, orientation, position, and velocity, in the coordinate system established by the master navigation component 110.

Figure 3:
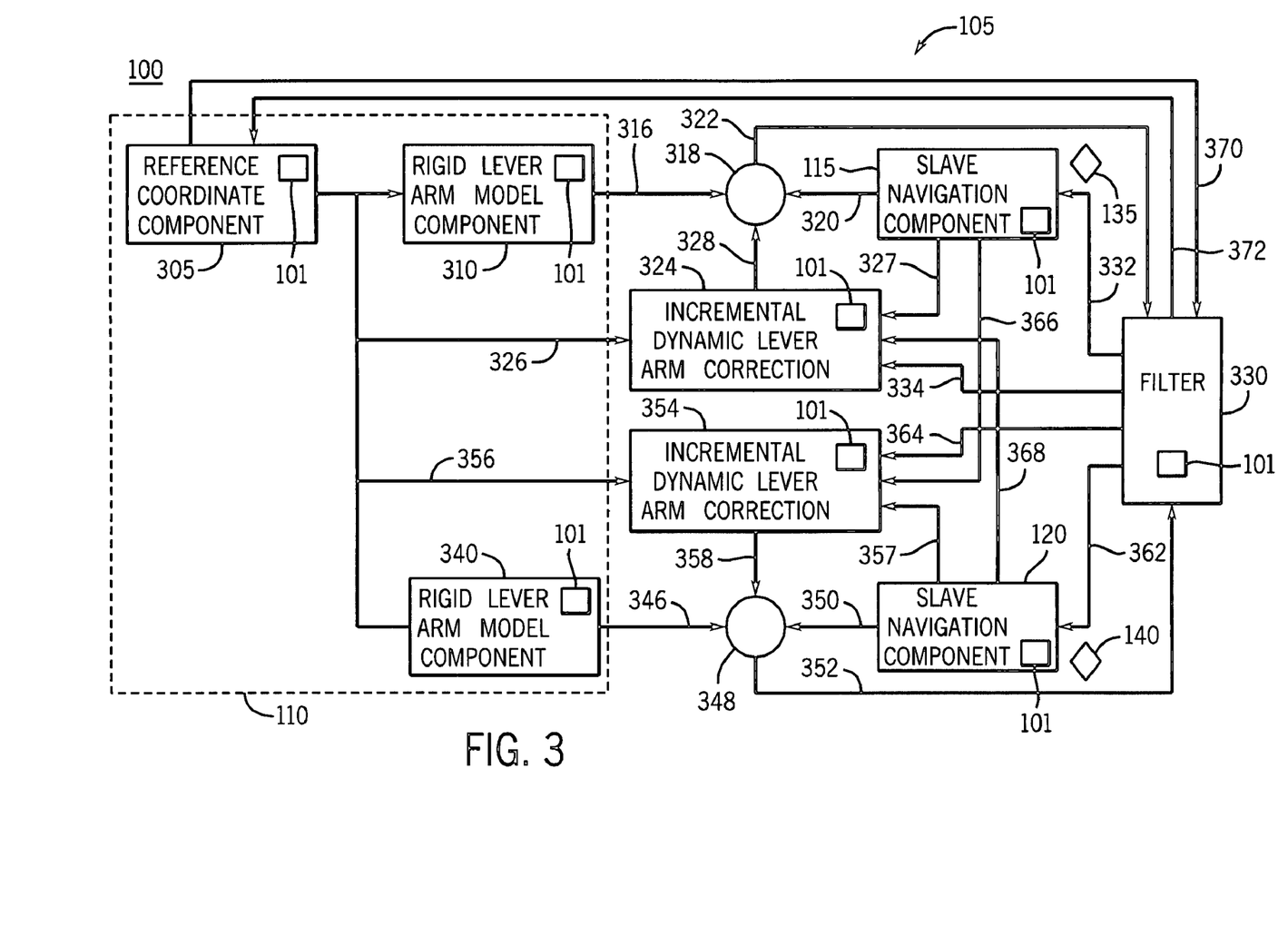
FIG. 3 is a representation of one implementation of one or more reference coordinate components and one or more rigid lever arm model components of the master navigation component, the slave navigation components, the sensors, the external positioning components, one or more incremental dynamic lever arm correction components, and one or more filters of the apparatus of FIG. 1.

Turning to FIG. 3, the master navigation component 110 in one example comprises one or more reference coordinate components 305 and one or more rigid lever arm model components 310 and 340. The reference coordinate component 305 establishes a coordinate system for the vehicle 105. For example, the rigid lever arm model component 310 comprises a base-line static position for the slave navigation component 115. The rigid lever arm model component 310 determines a base-line static lever arm for the slave navigation component 115 based on the base-line static position. The base-line static lever arm for the slave navigation component 115 comprises a three-dimensional position distance, or vector, between the master navigation component 110 and the slave navigation component 115. The rigid lever arm model component 310 cooperates with the reference coordinate component 305 to project the base-line static lever arm for the slave navigation component 115 in the coordinate system established by the reference coordinate component 305 to determine a translated static lever arm for the slave navigation component 115. The rigid lever arm model component 310 sends the translated static lever arm for the slave navigation component 115 as output 316 to a summing node 318.

The slave navigation component 115 determines navigation measurement data for the slave navigation component 115 in reference to a coordinate system established by the slave navigation component 115. The slave navigation component 115 sends as output 320, the navigation measurement data for the slave navigation component 115 in reference to the coordinate system established by the slave navigation component 115 to the summing node 318. The summing node 318 combines the output 316 from the rigid lever arm model component 310 with the output 320 from the slave navigation component 115 to produce as output 322, navigation measurement data for the slave navigation component 115 in reference to the coordinate system established by the reference coordinate component 305.

The output 322 comprising the navigation measurement data for the slave navigation component 115 in reference to the coordinate system established by the reference coordinate component 305 is enhanced through employment of an incremental dynamic lever arm correction component 324. The incremental dynamic lever arm correction component 324 comprises a model describing reactions of the vehicle 105 during motion. The incremental dynamic lever arm correction component 324 employs the model to provide positions for the slave navigation components 115 and 120 in relation to the reactions of the vehicle 105 during motion. For example, while in motion, the vehicle 105 reacts by bending. The bending of the vehicle 105 alters a lever arm (i.e., the three-dimensional distance vector) between the master navigation component 110 and the slave navigation component 115. As the vehicle 105 bends, the lever arm between the master navigation component 110 and the slave navigation component 115 changes.

The incremental dynamic lever arm correction component 324 receives as input, an output 326 from the reference coordinate component 305, and an output 327 from the slave navigation component 115. The output 326 comprises the coordinate system established by the reference coordinate component 305. The output 327 comprises the navigation measurement data for the slave navigation component 115 in reference to the coordinate system established by the slave navigation component 115, similar to the output 320. The incremental dynamic lever arm correction component 324 employs the outputs 326 and 327 to determine a dynamic lever arm for the slave navigation component 115 in reference to the coordinate system established by the reference coordinate component 305. The incremental dynamic lever arm correction component 324 sends as output 328, the dynamic lever arm for the slave navigation component 115 to the summing node 318. The summing node 318 combines the outputs 316, 320, and 328 to produce the output 322. Thus, the summing node 318 generates the output 322 as comprising more accurate navigation measurement data for the slave navigation component 115 in reference to the coordinate system established by the reference coordinate component 305 for the vehicle 105 in motion. The output 328 of the incremental dynamic lever arm correction component 324 obtains more accuracy through employment of a filter 330, for example, a Kalman filter, as will be discussed herein.

The filter 330 receives as input, the output 322 from the summing node 318. The filter 330 compares the output 322 for a given timestamp (i.e., the navigation measurement data for the slave navigation component 115 in reference to the coordinate system established by the reference coordinate component 305) with the navigation measurement data from the reference coordinate component 305 at the given timestamp. The filter 330 estimates errors in the output 322. The filter 330 provides as output 332, corrected navigation measurement data for the slave navigation component 115 in reference to the coordinate system established by the reference coordinate component 305. The slave navigation component 115 employs the output 332 to determine orientation, position, and velocity of the sensor 135 with respect to the coordinate system established by the reference coordinate component 305. The slave navigation component 115 employs the output 332 to adjust the coordinate system established by the slave navigation component 115. In addition, the filter 330 sends as output 334, the corrected navigation measurement data for the slave navigation component 115 in reference to the coordinate system established by the reference coordinate component 305 to the incremental dynamic lever arm correction component 324. The incremental dynamic lever arm correction component 324 employs the output 334 to correct the output 328, the dynamic lever arm for the slave navigation component 115. Thus, the incremental dynamic lever arm correction component 324, the slave navigation component 115 and the filter 330 cooperate to iteratively align a coordinate system of the slave navigation component 115 with the coordinate system established by the reference coordinate component 305.

The slave navigation component 120, the sensor 140, the reference coordinate component 305, rigid lever arm model component 340, summing node 348, incremental dynamic lever arm correction component 354, and outputs 346, 350, 352, 358, 357, 362, and 364 interact in a similar fashion to the slave navigation component 115, the sensor 135, the reference coordinate component 305, the rigid lever arm model component 310, the summing node 318, the incremental dynamic lever arm correction component 324, outputs 316, 320, 322, 326, 327, 328, 332 and 334. The reference coordinate component 305, the rigid lever arm model components 310 and 315, incremental dynamic lever arm correction components 324 and 354, and the filter 330, comprise one or more instances of a recordable data storage medium 101, as described herein.

Referring still to FIG. 3, the slave navigation component 115 sends as output 366, the navigation measurement data for the slave navigation component 115 to the incremental dynamic lever arm correction component 354. The incremental dynamic lever arm correction component 354 employs the output 366 to provide increased accuracy of the dynamic lever arm for the slave navigation component 120 in reference to the coordinate system established by the reference coordinate component 305. The slave navigation component 120 sends as output 368, the navigation measurement data for the slave navigation component 120 to the incremental dynamic lever arm correction component 324. The incremental dynamic lever arm correction component 324 employs the output 368 to provide increased accuracy of the dynamic lever arm for the slave navigation component 115 in reference to the coordinate system established by the reference coordinate component 305.

Referring again to FIG. 3, the filter 330 receives as input, navigation measurement data from the master navigation component 110, and the slave navigation components 115 and 120. The filter 330 receives as input, output 370 from the reference coordinate component 305, the output 322 from the slave navigation component 115, and the output 352 from the slave navigation component 120. The filter 330 employs the outputs 322, 352, and 370 to establish a coordinate system. For example, the filter 330 combines the outputs 322, 352, and 370 to establish the coordinate system, as will be appreciated by those skilled in the art. The filter 330 estimates errors in navigation measurement data received from the reference coordinate component 305, and the slave navigation components 115 and 120, and corrects the errors.

The filter 330 sends as output 372, the corrected navigation measurement data with respect to the coordinate system established by the filter 330 to the reference coordinate component 305. The reference coordinate component 305 employs the output 372 to adjust a coordinate system established by the reference coordinate component 305. For example, the reference coordinate component 305 employs the output 372 to adjust a base-line coordinate system established by the reference coordinate component 305. The filter 330 and the reference coordinate component 305 cooperate to align the coordinate system established by the reference coordinate component 305 and the coordinate system established by the filter 330. The filter 330 sends the outputs 332, 334, 362, and 364, the corrected navigation measurement data with respect to the coordinate system established by the filter 330 to the slave navigation components 115 and 120, and the incremental dynamic lever arm correction component 324 and 354.

Figure 4:
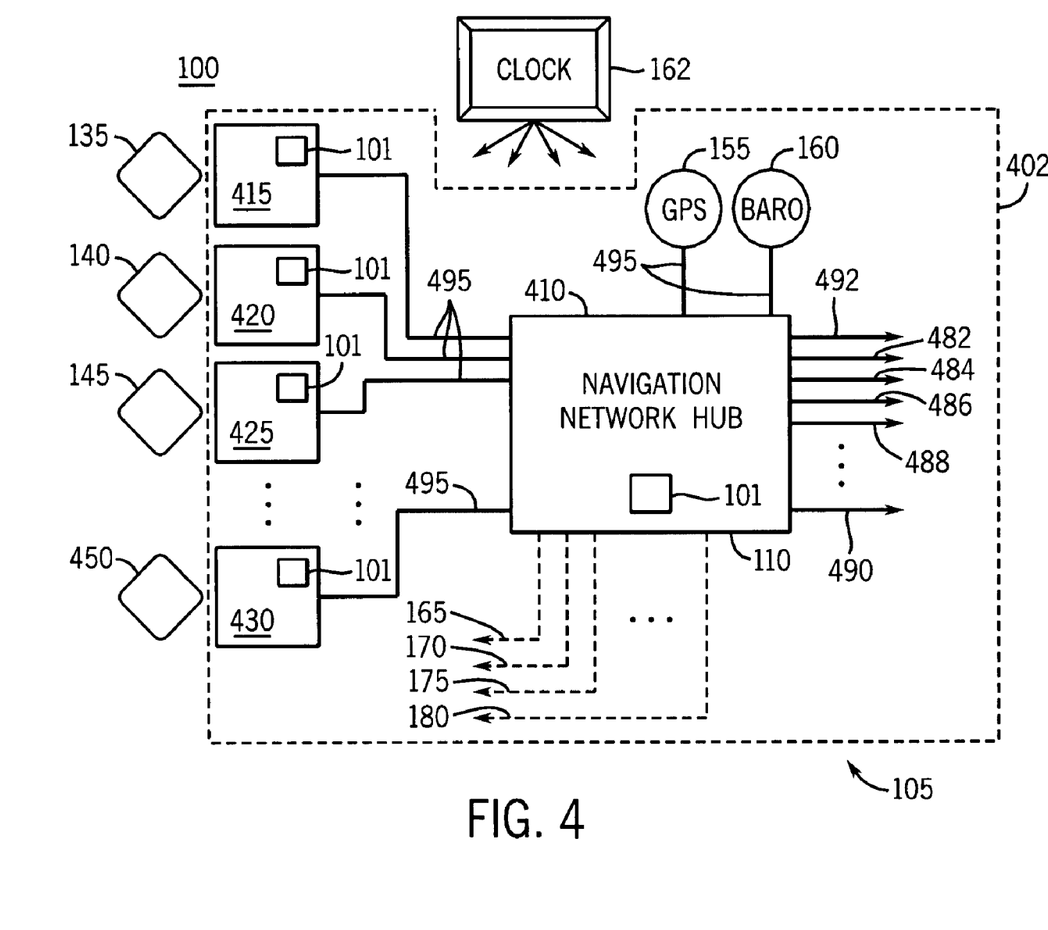
FIG. 4 is another representation of the apparatus of FIG. I comprising one or more navigation networks.

Turning to FIG. 4, the vehicle 105 comprises a navigation network 402. The navigation network 402 comprises a navigation network hub 410, and one or more navigation components 415, 420, 425, and 430. The navigation components 415, 420, 425, and 430 in one example comprise navigation components of varying degrees of accuracy. For example, the navigation components 415 and 420 comprise high performance navigation systems, similar to the master navigation component 110, and the navigation components 425 and 430 comprise lower performance navigation systems, similar to the slave navigation components 115, 120, 125, and/or 130. The navigation components 415, 420, 425, and 430 obtain navigation measurement data for the navigation components 415, 420, 425, and 430 and determine navigation parameters (i.e., orientations, positions, and velocities) for the sensors 135, 140, 145, and 150.

The navigation network hub 410 in one example receives the inertial measurement information from the navigation components 415, 420, 425, and 430. The navigation network hub 410 employs the navigation measurement data from the navigation components 415, 420, 425, and 430 to establish a coordinate system for the vehicle 105. The navigation network hub 410 determines one or more navigational parameters, for example, orientations, positions, and velocities, for the sensors 135, 140, 145, and 150 with respect to the coordinate system established by the navigation network hub 410. The navigation network hub 410 provides the navigation parameters (i.e. orientations, velocities, and positions) of the sensors 135, 140, 145, and 150 in the coordinate system established by the navigation network hub 410, as illustrated by outputs 482, 484, 486, and 490. The navigation network hub 410 provides the orientation of the coordinate reference system established by the navigation network hub 410 as output 492. The navigation network hub 410, and the navigation components 415, 420, 425, and 430 in one example comprise one or more instances of a recordable data storage medium 101, as described herein.

The navigation network hub 410 and the navigation components 415, 420, 425, and 430 communicate through employment of one or more instances of a network bus 495. In one example, the network bus 495 comprises a high speed transmission bus. In another example, the network bus 495 comprises an Ethernet communication means. The navigation components 415, 420, 425, and 430 in one example employ the network bus 495 to transmit navigation measurement data to the navigation network hub 410. In one example, the navigation network hub 410 employs the network bus 495 to transmit corrected navigation measurement data 165, 170, 175, and 180 to the navigation components 415, 420, 425, and 430. In another example, the navigation network hub 410 employs the network bus 495 to provide outputs 482, 484, 486, 488, 490, and 492. In yet another example, the navigation network hub 410 employs the network bus 495 to communicate with the external positioning components 155 and 160. The navigation network hub 410 employs a standard protocol over the network bus 495 to provide a common interface to multiple external components, for example, the navigation components 415, 420, 425, and 430, the external positioning components 155 and 160, and one or more vehicle computers (not shown).

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example employs one or more computer-readable signal-bearing media. The computer-readable signal-bearing media store software, firmware and/or assembly language for performing one or more portions of one or more embodiments of the invention. Examples of a computer-readable signal-bearing medium for the apparatus 100 comprise the recordable data storage medium 101 of the master navigation component 110, the slave navigation components 115, 120, 125, and 130, the reference coordinate component 305, the rigid lever arm model components 310 and 315, incremental dynamic lever arm correction components 324 and 354, the filter 330, the navigation network hub 410, and the navigation components 415, 420, 425, and 430. The computer-readable signal-bearing medium for the apparatus 100 in one example comprise one or more of a magnetic, electrical, optical, biological, and atomic data storage medium. For example, the computer-readable signal-bearing medium comprises floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
  a master navigation component determines navigation measurement data in a first coordinate system; and
  one or more slave navigation components that determine navigation measurement data of the one or more slave navigation components each in their own secondary coordinate system;
  wherein the master navigation component is disposed at a first location in a vehicle and a first one of the slave navigation components is disposed at a second location in the vehicle, the first and second coordinate systems being associated with the first and second locations, respectively;
  wherein the one or more slave navigation components provide the navigation measurement data of the one or more slave components each in their own secondary coordinate system to the master navigation component;
  wherein the master navigation component compares the navigation measurement data of the one or more slave components each in their own secondary coordinate system to navigation measurement data for the master navigation component in the first coordinate system, the master navigation component and the slave navigation components obtaining measurement data using the same type of measuring instruments and without information being received from a source outside of the vehicle;
  wherein the master navigation component translates the navigation measurement data of the one or more slave navigation components in the second coordinate system into navigation measurement data of the one or more slave navigation components in the first coordinate system;
  a portion of the vehicle between the first location with the master navigation component and the second location with the first one of the slave navigation components defining a corresponding lever arm;
  a dynamic location component coupled to the master navigation component wherein the dynamic location component provides dynamic information during bending of the lever arm between the first and second locations due to bending of said portion of the vehicle, the displacement between the first slave navigation component and the master navigation component changing due to physical deflection of the second location relative to the first location, the master navigation component estimating the error in the navigation measurement data of the first slave navigation component at the second location based on the dynamic displacement information during bending of the lever arm due to bending of the vehicle;
  the master navigation component correcting the navigation measurement data of the first one of the slave navigation components based on the estimated errors due to bending of the portion of the vehicle defining the lever arm;
  a static location component coupled to the master navigation component wherein the static location component provides static navigation information based on the distance between the first and second locations while the vehicle is not undergoing bending, the master navigation component estimates the error in the navigation measurement data of the first slave navigation component at the second location based on the static distance information;
  a summation element that receives inputs from the static location component and the dynamic location component, the summation element providing an output that provides estimates of error in the navigation measurement data of the second coordinate system relative to the first coordinate system based on the dynamic displacement data and static navigation information.

2. The apparatus of claim 1 wherein the master navigation component and the one or more slave navigation components are one of accelerometers and gyroscopes.

3. The apparatus of claim 2 wherein the master navigation component estimates errors in the navigation measurement data of the one or more slave navigation components through employment of a Kalman filter.

4. The apparatus of claim 2 wherein the master navigation component corrects the navigation measurement data of the one or more slave navigation components each in their own secondary coordinate system based on the estimated errors.

5. The apparatus of claim 1 wherein the master navigation component corrects the navigation measurement data of the first slave navigation component based on the static distance and dynamic displacement information.

6. The apparatus of claim 5 wherein the master navigation component translates the navigation measurement data of the first slave navigation component in the second coordinate system into navigation measurement data in the first coordinate system based on the navigation measurement data corrected for static and dynamic displacement information.

7. The apparatus of claim 1 wherein the master and slave navigation components each includes a time synchronization component that encodes master and slave navigation measurement data with time information so that master and slave measurement data as of substantially the same time can be utilized in estimating the error in the navigation measurement data of the first slave navigation component at the second location based on the dynamic displacement information.

8. A method for determining navigation information comprising the steps of:
generating master navigation measurement data by a master navigation component with a first coordinate system at a first location in a vehicle;
generating slave navigation measurement data by a slave navigation component with a second coordinate system in a second location in the vehicle, a portion of the vehicle between the first and second locations defining a lever arm, the master navigation measurement data and the slave navigation measurement data being obtained using the same type of measuring instruments and without information being received from a source outside of the vehicle;
determining dynamic information for displacement changes between the first and second locations during physical deflection of the lever arm due to bending of the portion of the vehicle;
determining static information by a static location component coupled to the master navigation component wherein the static information is based on the distance between the first and second locations while the vehicle is not undergoing bending;
estimating error in the slave navigation measurement data at the second location based on the static distance information;
receiving the static information and the dynamic information;
providing an estimation of errors in the slave navigation measurement data based on the master navigation measurement data and summation of the dynamic displacement information and the static information;
correcting the slave navigation measurement data based on the estimated errors;
translating the corrected slave navigation measurement data into navigation measurement data in the first coordinate system;
determining at least one of velocity, position and orientation of the vehicle based on the corrected slave navigation measurement data.

9. The method of claim 8 wherein the master navigation measurement data and the slave navigation measurement data are one of acceleration and gyroscopic data.

10. The method of claim 8 further comprising the step of encoding master and slave navigation measurement data with time information so that master and slave measurement data as of substantially the same time is used in estimating the error in the navigation measurement data of the first slave navigation component at the second location based on the dynamic displacement information.

* * * * *